E. J. SCHULZE.
ATTACHMENT FOR BABY CARRIAGES AND GO-CARTS.
APPLICATION FILED NOV. 17, 1913.

1,105,379.

Patented July 28, 1914.
2 SHEETS—SHEET 1.

Witnesses
Harold Seidelberg
Edna Broyles

Inventor
Ernest J. Schulze

By Herbert E. Smith
Attorney

E. J. SCHULZE.
ATTACHMENT FOR BABY CARRIAGES AND GO-CARTS.
APPLICATION FILED NOV. 17, 1913.
1,105,379.
Patented July 28, 1914.
2 SHEETS—SHEET 2.
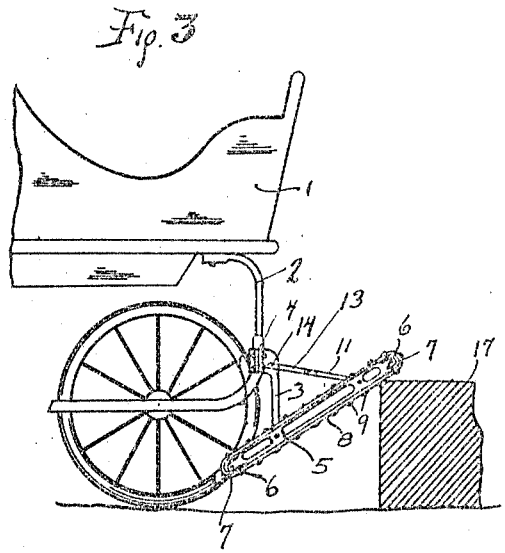
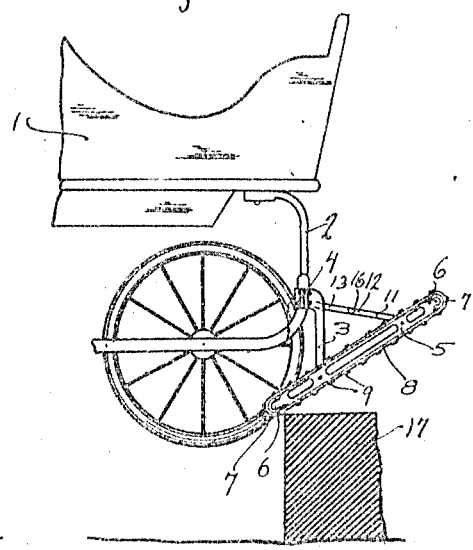
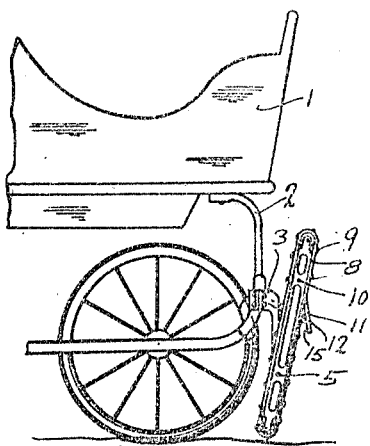
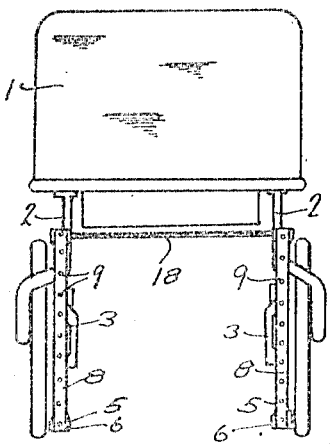
Inventor
Ernest J. Schulze
Witnesses
Harold Scatchbury
Edna Broyles
By Herbert E. Smith
Attorney

UNITED STATES PATENT OFFICE.

ERNEST J. SCHULZE, OF SPOKANE, WASHINGTON.

ATTACHMENT FOR BABY-CARRIAGES AND GO-CARTS.

1,105,379.   Specification of Letters Patent.   Patented July 28, 1914.

Application filed November 17, 1913. Serial No. 801,518.

*To all whom it may concern:*

Be it known that I, ERNEST J. SCHULZE, a citizen of the United States, residing at Spokane, in the county of Spokane and State of Washington, have invented new and useful Improvements in Attachments for Baby-Carriages and Go-Carts, of which the following is a specification.

My invention relates to an improvement in baby carriages or go-carts, and has as its principal object the provision of means whereby a baby carriage may be pushed forwardly up a curb without needing to be tilted backward.

A further object of my invention resides in the particular arrangement and combination of parts hereinafter described.

Figures 1, 7:
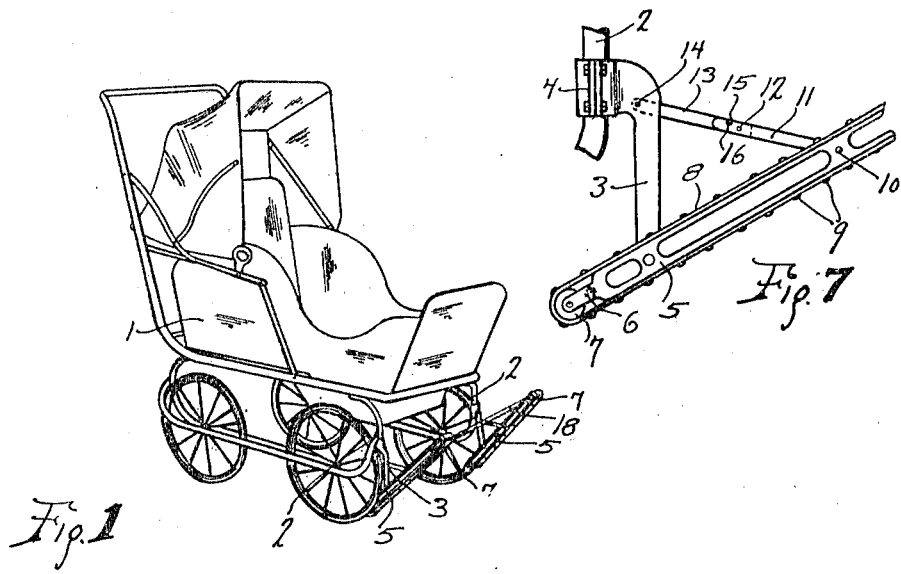
Figure 2:
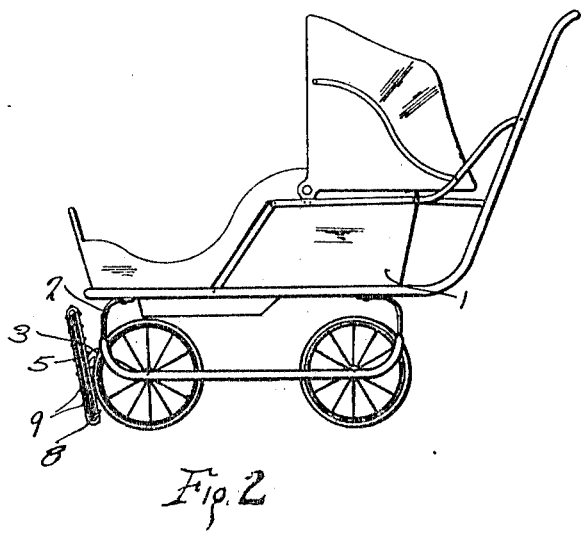

In the accompanying drawings, Figure 1 is a perspective view of a baby carriage embodying my invention. Fig. 2 is a side elevation of the carriage shown in Fig. 1. Fig. 3 is a partial view of the carriage shown in Fig. 2 as it is about to ascend a curb, but drawn to a larger scale. Fig. 4 is a view similar to Fig. 3 but showing the carriage near the top of the curb. Fig. 5 is a view similar to Fig. 3 but showing the carriage arranged for traveling on level ground. Fig. 6 is a front elevation of the machine as shown in Fig. 5. Fig. 7 is a detail view on a larger scale of a portion of the mechanism for lifting the carriage up a curb.

In the separate views the same part is designated by the same reference character.

Referring more particularly to the drawing, 1 is a baby carriage which may be of any approved design and which is provided with frame pieces such as 2—2. Attached to each frame piece 2 is a bracket such as 3 which is split as shown at 4 so that it may be clamped to the frame piece in any suitable position and so that the brackets may be attached to previously manufactured carriages. As clearly shown in Fig. 3, the brackets extend downwardly somewhat in front of the forward wheels 4. At their lower ends the brackets 3 provide pivotal supports for a pair of tractor frames such as 5. Each tractor frame is provided at each end with a pair of lugs such as 6—6 in which are pivoted wheels such as 7—7. Around each frame 5 and its corresponding wheel 7 is trained a belt 8 which carries exterior lugs or projections 9.

At the point 10 each frame is pivoted to a link 11 which is pivoted in turn at the point 12 to a second link 13 which is journaled to the brackets at the point 14. The links 11 and 13 form a toggle which, when straightened, forces the frame 5 forwardly into an upwardly inclined position as shown in Figs. 1, 3, 4 and 7. It will be seen, moreover, that the link 11 extends forwardly of its pivot point 12 with the link 13, and is provided with a notch or cut out portion 15 which is adapted to engage with a pin or projection 16 carried by the link 13 so that when the links are placed in alinement as in Fig. 3 the joints between them can be broken only by pulling upwardly on the same. If now the links and frame are thrown into the position of Figs. 3 and 7, the forward end of the belt 8 may be pushed against the edge of the curb such as 17 and as the lower edge of the belt is pushed against the curb, one of the projections 9 will engage the edge of the curb and prevent any tendency to upset, whereupon further pushing against the handle of the carriage will cause the belt 8 to travel around the wheels 7 thus elevating the forward end of the carriage to the position shown in Fig. 4, wherein the wheels 4 are in a position to roll up onto the curb.

As shown in Fig. 6, I prefer to connect the forward and upper ends of the frames 5 by means of a cross bar such as 18, although I do not consider this arrangement essential. It will be understood furthermore that the wheels 7 may be provided with flanges if so desired, to prevent the belt 8 from slipping off of the wheels when going up a curb.

It will be understood that throughout the foregoing specification and in the appended claims I have used the word "belt" in a generic manner and intend thereby to cover, not only the ordinary plain belt but also its mechanical equivalent such as sprocket chains and the like. It is of course obvious that if the belt 8 was substituted by sprocket chains, that the wheels 7 would be of the sprocket type. It will be understood further that while I have shown and described the preferred form of my invention, that I do not wish to be limited thereto except for such limitations as the claims may import.

Having thus described my invention, what I claim is:—

1. A baby carriage comprising in combination, a main frame, a tractor frame secured to said main frame and projecting forwardly therefrom in an upwardly inclined direction, and a belt trained around said tractor frame.

2. A baby carriage comprising in combination, a main frame, a tractor frame secured to said main frame and projecting forwardly therefrom in an upwardly inclined direction, a belt trained around said tractor frame, and means whereby said tractor frame may be turned into a substantially vertical position.

3. A baby carriage comprising in combination, a main frame, a bracket secured to said frame and extending downwardly therefrom, a tractor frame pivoted to said bracket at its lower end, wheels pivoted on said tractor frame at the opposite ends thereof, and a belt trained around said wheels.

4. A baby carriage comprising in combination, a main frame, a bracket secured to said frame and extending downwardly therefrom, a tractor frame pivoted to said bracket at its lower end, wheels pivoted on said tractor frame at the opposite ends thereof, a belt trained around said wheels, and studs carried on the outer side of said belt.

5. A baby carriage comprising in combination, a main frame, a bracket secured to said frame and extending downwardly therefrom, a tractor frame pivoted to said bracket at its lower end, wheels pivoted on said tractor frame at the opposite ends thereof, a belt trained around said wheels, and toggle links connecting said brackets to said tractor frame at a point forwardly of the point of connection between the tractor frame and the brackets.

6. A baby carriage comprising in combination, a main frame, a pair of split brackets attached to said frame near the forward end thereof and extending downwardly therefrom, a tractor frame pivoted to each of said brackets near the lower end thereof, wheels pivoted at the opposite ends of each of said tractor frames, a belt trained about said wheels, a pair of toggle links connecting each of said tractor frames with its corresponding bracket, the point of connection between each pair of links and each tractor frame being at a point forwardly of the point of connection between the tractor frame and its corresponding bracket, and a rod connecting the forward ends of said tractor frames.

In testimony whereof I affix my signature in the presence of two witnesses.

ERNEST J. SCHULZE.

Witnesses:
HAROLD SCANTLEBURY,
EMILY FOSDICK.